United States Patent [19]

Michel et al.

[11] 4,430,772

[45] Feb. 14, 1984

[54] DEVICE FOR SIMULTANEOUSLY DESHIRRING, SMOOTHING AND BRAKING A SHIRRED TUBULAR CASING

[75] Inventors: Wolfgang Michel; Reinhold Becker, both of Wiesbaden, Fed. Rep. of Germany

[73] Assignee: Hoechst Aktiengesellschaft, Frankfurt am Main, Fed. Rep. of Germany

[21] Appl. No.: 377,868

[22] Filed: May 13, 1982

[30] Foreign Application Priority Data

May 21, 1981 [DE] Fed. Rep. of Germany ........ 3120205

[51] Int. Cl.³ .............................................. A22C 11/00
[52] U.S. Cl. .......................................... 17/33; 17/49; 17/35; 138/118.1; 428/36; 53/576
[58] Field of Search ........................ 17/49, 33, 34, 1 R, 17/1 F; 138/118.1; 428/36; 426/512, 513; 53/576

[56] References Cited

U.S. PATENT DOCUMENTS

| 3,975,795 | 8/1976 | Kupcikevicius et al. | 17/41 |
| 4,034,441 | 7/1977 | Kupcikevicius et al. | 17/41 |
| 4,077,090 | 3/1978 | Frey et al. | 17/41 |
| 4,307,489 | 12/1981 | Niedecker | 17/49 |
| 4,325,413 | 4/1982 | Lenhart et al. | 138/109 |

FOREIGN PATENT DOCUMENTS

| 21189 | 1/1981 | European Pat. Off. | |
| 2600275 | 7/1977 | Fed. Rep. of Germany | 53/576 |

OTHER PUBLICATIONS

European Search Report.

Primary Examiner—Willie G. Abercrombie
Attorney, Agent, or Firm—Schwartz, Jeffery, Schwaab, Mack, Blumenthal & Koch

[57] ABSTRACT

A device for deshirring, smoothing and braking a shirred tubular casing during stuffing of the tubular casing with a fluid material, such as a sausage mixture, comprising a substantially rigid hollow body with an outer circumferential surface having a substantially circular cross section and with a central opening having securing elements for receiving and releasably securing the hollow body on the outer surface of the stuffing horn of a stuffing device adjacent the stuffing horn outlet. The hollow body is disposed inside an unshirred end portion of the shirred tubular casing having a prescribed inner diameter, and said hollow body has a substantially annular, cylindrical form with a maximum external diameter which is smaller than the prescribed inner diameter of the unshirred tubular casing. The outer circumferential surface of the hollow body is provided with an annular recess having a substantially V-shaped or U-shaped cross section whereby the minimum diameter of the hollow body in the region of the recess is from 25 to 65 percent smaller than the maximum diameter of said hollow body. The device further comprises a braking unit for restricting the speed of withdrawal of the tubular casing during stuffing.

25 Claims, 14 Drawing Figures

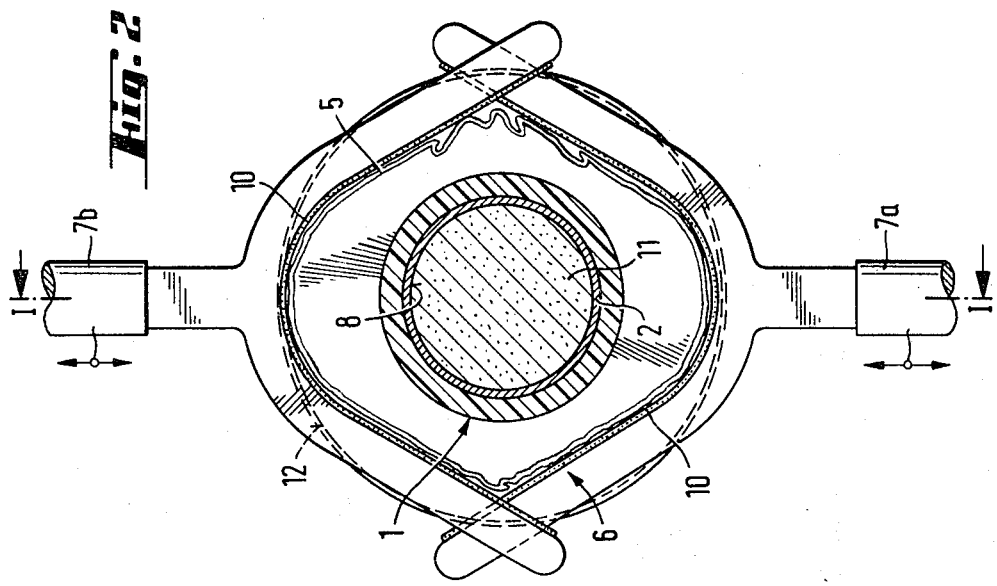
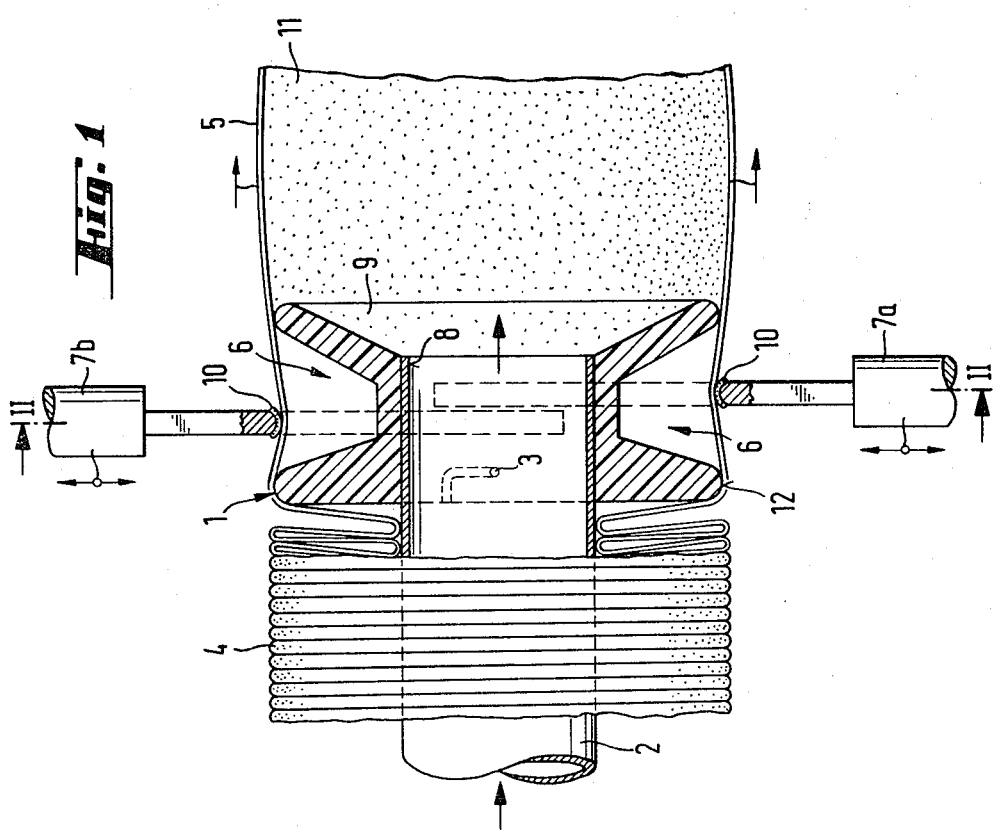

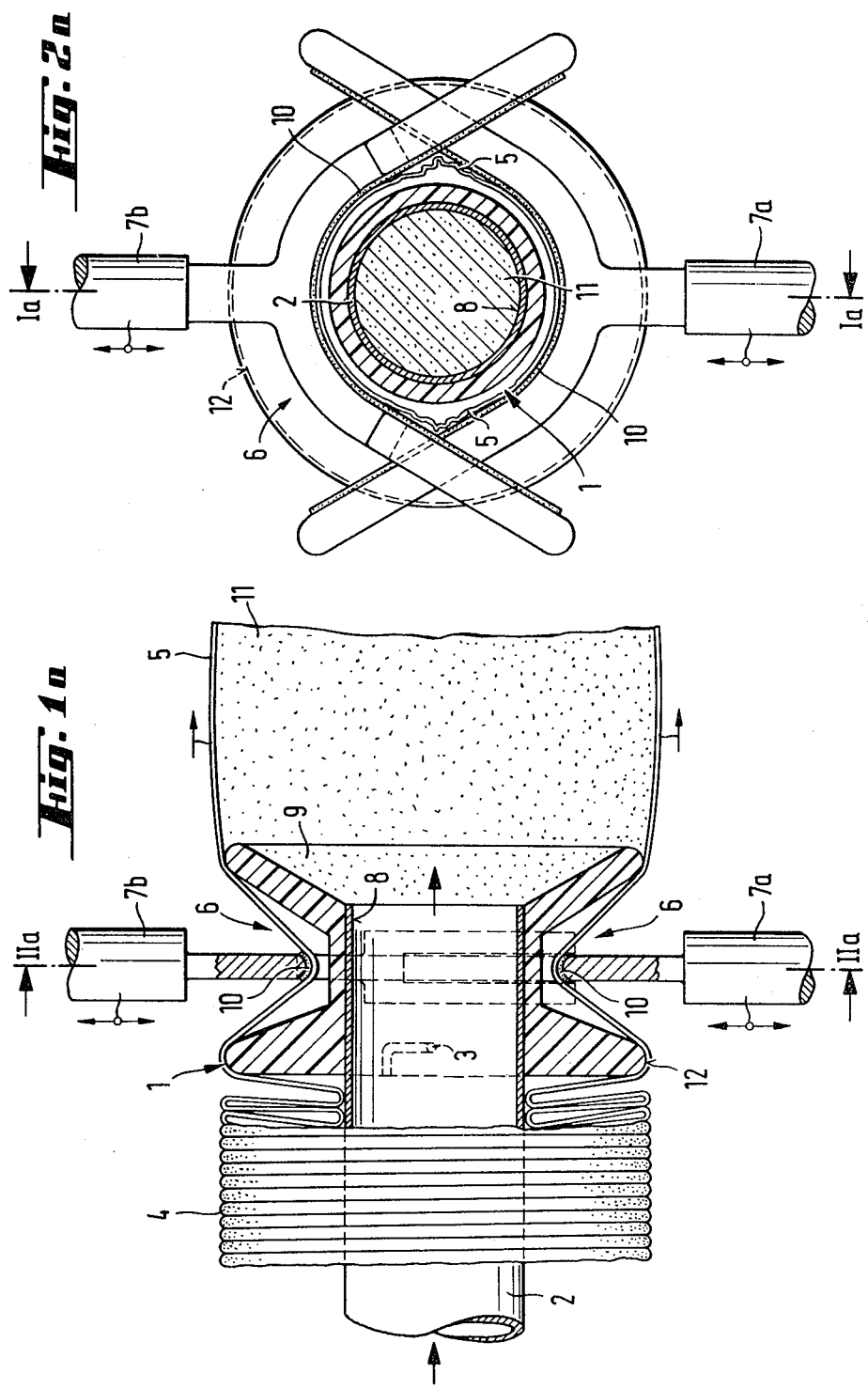

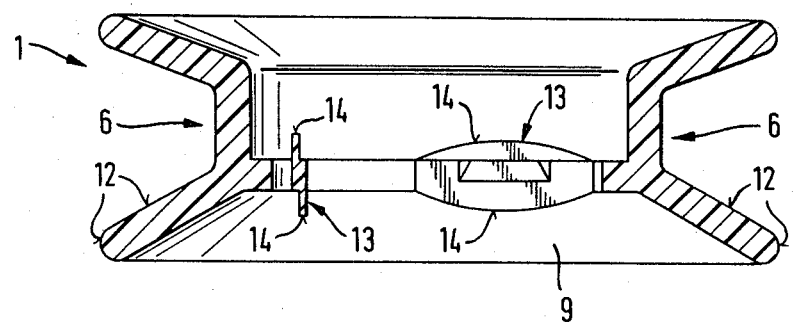
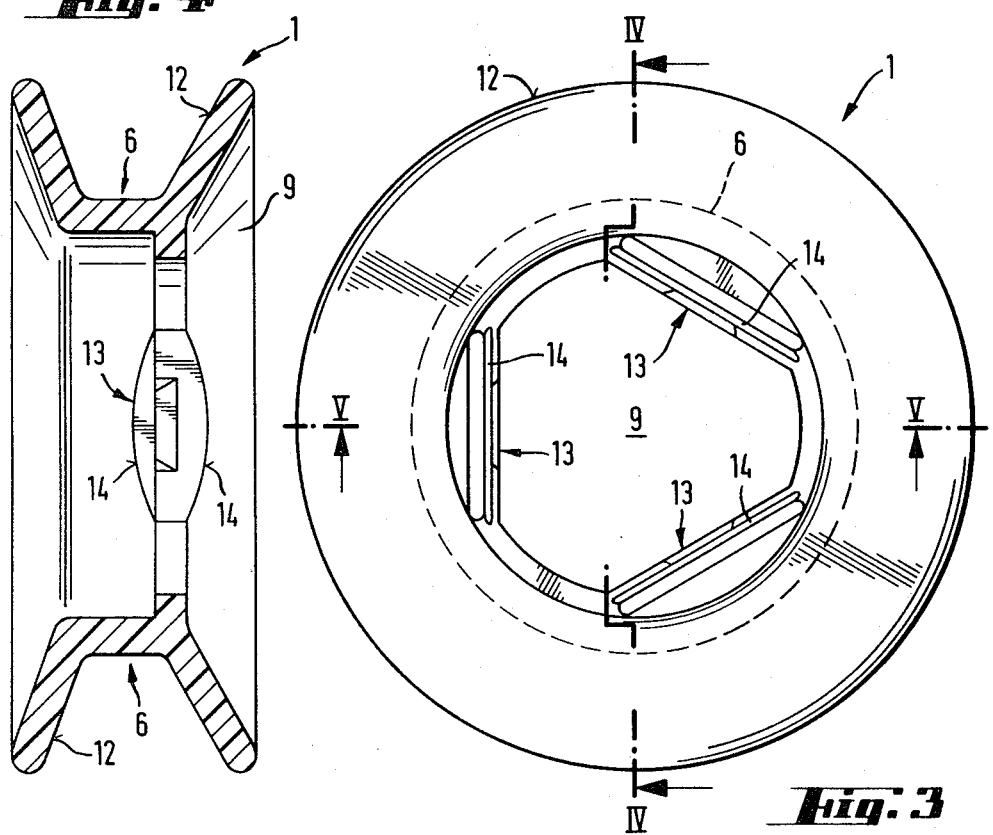

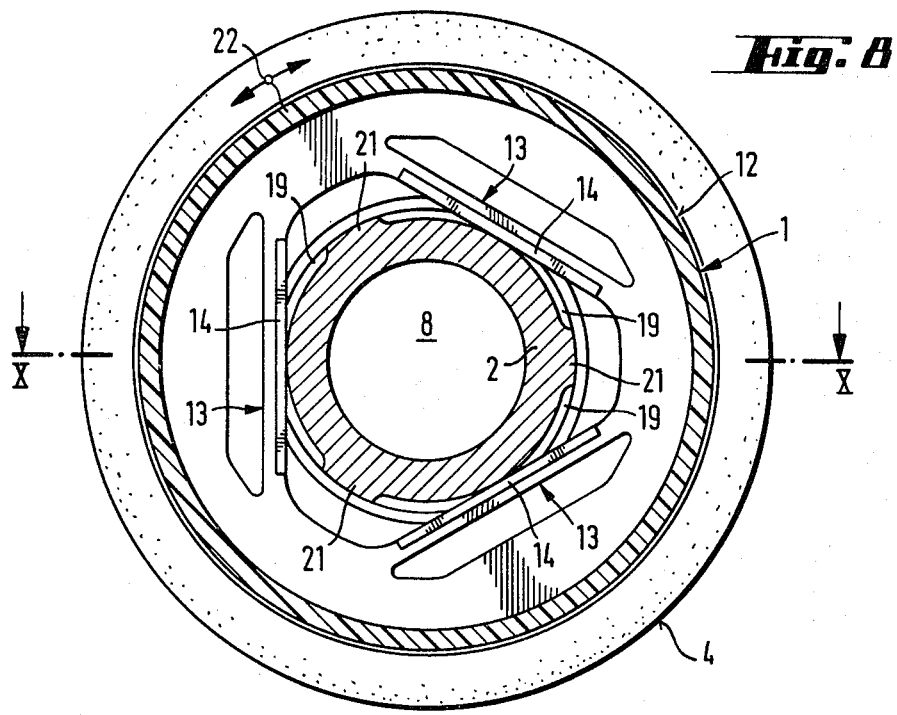
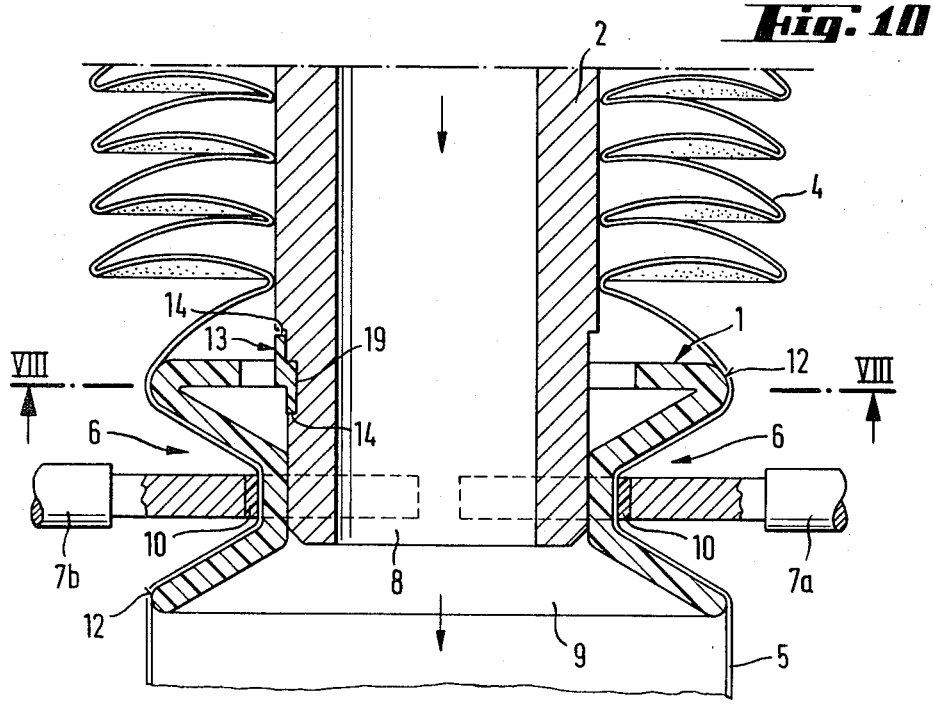

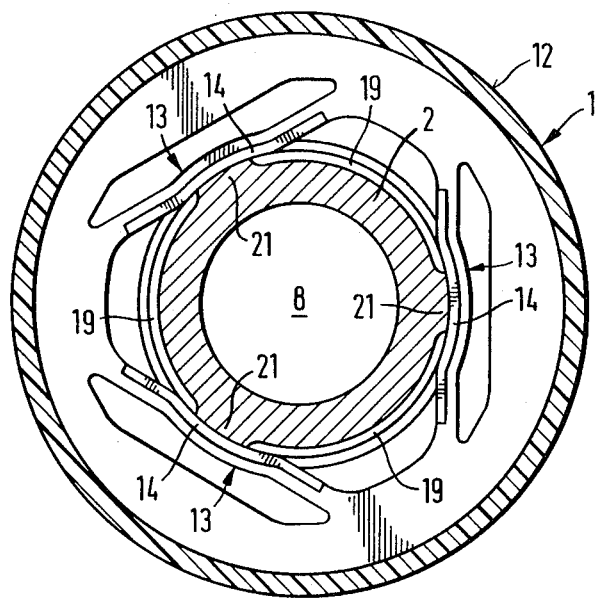

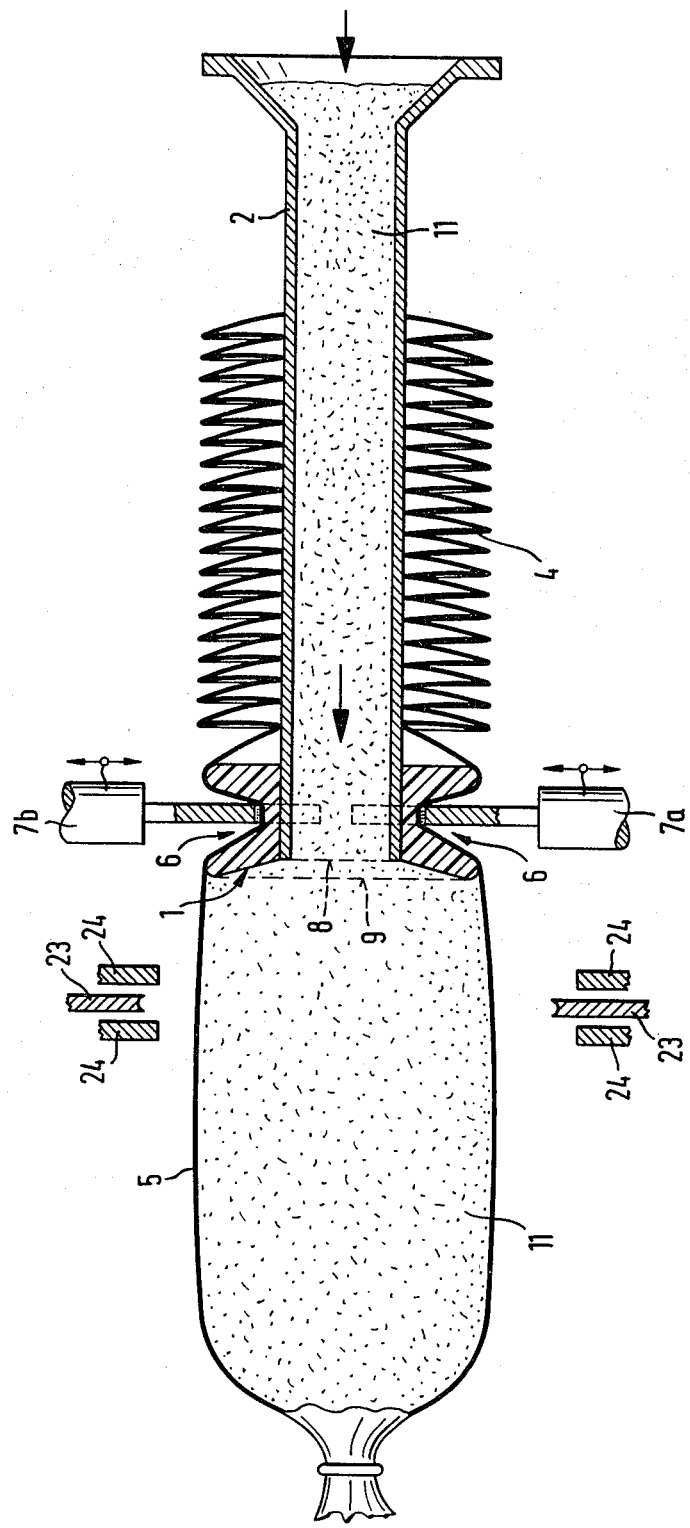

DEVICE FOR SIMULTANEOUSLY DESHIRRING, SMOOTHING AND BRAKING A SHIRRED TUBULAR CASING

BACKGROUND OF THE INVENTION

The present invention relates to a device for deshirring or unfolding, smoothing and braking or restricting the movement of a shirred tubular casing during the filling of the casing with a fluid material such as a sausage mixture. The invention further relates to an apparatus containing such a device and to an article of manufacture containing such a device.

It is known to use shirred tubular casings of synthetic, semi-synthetic or natural materials for packing food products, for example meat products in the form of sausages. These shirred casings, which are known in the trade as "sticks" or "hollow rods", are produced by gathering and longitudinally compressing long casings to approximately one to three percent of their original length. In order to fill the shirred casing with a sausage mixture or other food product, generally, one end of the shirred casing is first closed, and then the shirred casing is normally fit onto the filling tube or stuffing horn of a sausage machine. A sausage mixture is then forced under pressure through the stuffing horn into the casing which is thereby continuously unfolded or deshirred. After a predetermined length of the casing has been filled, the filled casing is subdivided into cylindrical sausages which are then tied off and closed.

For various reasons, the diameter of the sausages which are produced should remain constant throughout their entire length. Optimum filling of the tubular casing can be assured only by a uniform diameter, the size of which is dependent upon the particular casing. If the casing is overstuffed, it may burst, whereas if the casing is insufficiently filled, it will have a wrinkled surface.

Various devices for stuffing shirred tubular casings with sausage mixtures have been proposed which comprise special arrangements for achieving the most uniform diameter possible for the filled casings.

Thus, it is conventional to dispose adjacent the outlet of the stuffing horn, a calibrating means, the periphery of which presses against the inside wall of the casing to be filled and expands the casing. The contact pressure between the calibrating means and the inside wall of the casing gives rise to frictional forces which brake or retard the motion of the casing (U.S. Pat. No. 2,871,508).

It is also known to package the shirred tubular casing together with a calibrating disk and to connect this assembly to the stuffing horn of a sausage machine prior to the filling operation. The calibrating disk is enclosed or surrounded by an unshirred portion of the casing, whereby the outer circumference of the calibrating disk should be larger than the internal circumference of the deshirred casing. During the filling operation, the casing is drawn over the calibrating disk and is thereby stretched and expanded (U.S. Pat. No. 4,077,090). The calibrating disk must be made of a rigid, inelastic material so that its diameter will not be altered by the contact pressure of the casing against the periphery of the calibrating disk. Braking of the casing as it is withdrawn from the shirred portion during the filling operation is effected by means of an auxiliary device having the form of a ring with an annular attachment disposed following the calibrating disk whereby the braking effect is controlled by the frictional forces produced between the tubular casing and the attachment.

These inelastic calibrating disks have the disadvantage that the variations in casing circumference which cannot be avoided during the manufacturing process, will prevent optimum filling of the casing from being achieved. If the diameter of the casing is too small, there is a danger that the casing may be damaged or torn by the calibrating disk. At the very least, an especially strong frictional force will arise between the casing and the calibrating disk so that the casing will be overfilled with sausage mixture and have a tendency to be unable to withstand the high pressures which arise during boiling of the sausage and to burst.

U.S. Pat. No. 4,202,075 discloses a calibrating means which is made of a flexible material and has a variable diameter. This device is also intended to stretch and expand the tubular casing prior to the casing being filled with a sausage mixture, while the device provides a controllable degree of expansion. Even with this device, however, strong frictional forces can occur between the tubular casing and the calibrating means. With this device, the braking of the tubular casing is effected by means of a braking element which is disposed after the calibrating device and which presses the tubular casing against the stuffing horn.

SUMMARY OF THE INVENTION

Accordingly, it is the object of the present invention to provide an improved device for deshirring, smoothing and braking a shirred tubular casing prior to stuffing the casing with a fluid mixture.

Another object of the present invention is to provide a device for deshirring, smoothing and braking a shirred tubular casing which can convert the casing from the shirred to the deshirred condition without defects or wrinkles.

It is also an object of the present invention to provide a device for simultaneously deshirring, smoothing and braking a casing which avoids the danger that the tubular casing may be damaged by the calibrating means or the braking means.

A further object of the invention is to provide a device with a braking means which facilitates a smooth, jerk-free withdrawal of the casing.

An additional object of the present invention is to provide a device for simultaneously deshirring, smoothing and braking a shirred tubular casing which reduces the danger of tearing the casing.

These and other objects of the invention are achieved by providing a device for simultaneously deshirring, smoothing and braking a shirred tubular casing during the stuffing of the casing with a fluid material, said device comprising a hollow body having an outer circumferential surface with a substantially circular cross section and having a central opening with fastening means so that the hollow body can be received on and releasably secured to the exterior surface of the stuffing horn of a stuffing device adjacent the stuffing horn outlet, said hollow body being disposable in the interior of a deshirred portion of a shirred tubular casing having a prescribed internal diameter; said hollow body being substantially rigid and having a substantially annular, cylindrical form with an outer periphery presenting a plurality of smooth surfaces; the maximum outer diameter of said hollow body being smaller than the prescribed inner diameter in the unshirred condition of the tubular casing which is to be filled, the outer circumferential surface of the hollow body being provided with an annular recess having a substantially V-shaped or U-shaped cross section, and the minimum diameter of the hollow body in the region of the recess being from 25 to 65 percent smaller than the maximum diameter of the hollow body.

In a further aspect of the invention, the objects of the invention are achieved by providing an apparatus for stuffing a shirred tubular casing with a fluid material which flows under pressure out of the stuffing horn of a stuffing device, said apparatus comprising a stuffing horn, a shirred tubular casing disposed on the outer surface of said stuffing horn, said casing having an unshirred portion having a prescribed inner diameter, a hollow body for deshirring and smoothing said tubular casing disposed within the unshirred portion of said tubular casing and secured to the outer surface of said stuffing horn, the outer circumferential surface of said hollow body having a substantially circular cross section, said hollow body having a central opening for receiving the stuffing horn, means in said opening for releasably securing said hollow body to said stuffing horn, said hollow body comprising a rigid material and having a substantially annular, cylindrical form with an outer periphery having a plurality of surfaces, the maximum exterior diameter of said hollow body being smaller than said prescribed inner diameter of the unshirred tubular casing, the outer circumferential surface of said hollow body being provided with an annular recess having a substantially V-shaped or U-shaped cross section, the minimum diameter of said hollow body in the region of said recess being from 25 to 65 percent smaller than the maximum diameter of said hollow body, a braking unit for restraining the movement of the tubular casing having an opening through which the deshirred portion of the tubular casing extends, said braking unit surrounding the deshirred portion of said tubular casing in the region of said recess in the hollow body and urging said tubular casing with an adjustable pressure into said recess, a tying device disposed following said stuffing horn for applying a closure to said tubular casing after a predetermined length of the tubular casing has been stuffed with fluid material, and a cutting station for separating the stuffed and closed portion of the tubular casing, whereby the inner wall of said tubular casing slides over the outer circumferential surface of said hollow body and is thereby deshirred and smoothed and the motion of the tubular casing is restrained by the extension of the braking unit into the region of the recess in the hollow body.

In yet another aspect of the invention, the objects are achieved by providing a prepackaged article of manufacture for use with a stuffing device comprising a shirred tubular casing for containing a food substance, said casing having an unshirred end which is closed off, a device for deshirring and smoothing said casing during the stuffing process disposed within the unshirred end of said casing, said deshirring and smoothing device having the form of an annular, cylindrical hollow body of a rigid material with a peripheral surface presenting a plurality of smooth surfaces having a substantially circular cross section and with a central opening having fastening elements for receiving and releasably securing said hollow body on the outer surface of a stuffing horn of a stuffing device, the maximum external diameter of said hollow body being smaller than the predetermined internal diameter in the unshirred condition of the tubular casing, the outer circumferential surface of said hollow body having an annular recess with a substantially V-shaped or U-shaped cross section, and the minimum diameter of said hollow body in the region of said recess being from 25 to 65 percent smaller than the maximum diameter of said hollow body; and a protective cover surrounding the exterior of the tubular casing; whereby said article of manufacture can be received on and secured to the stuffing horn of a stuffing device and as the deshirred portion of the tubular casing is stuffed with a fluid material from the stuffing horn, the shirred portion of said tubular casing is drawn over said hollow body and thereby deshirred and smoothed prior to filling.

BRIEF DESCRIPTION OF THE DRAWINGS

The invention will be explained in greater detail with reference to the accompanying drawings wherein:

FIG. 1 is a sectional side elevation of an annular hollow body disposed on and releasably secured to a stuffing horn with the tubular casing subjected to slight braking.

FIG. 2 is a transverse sectional view of the annular hollow body of FIG. 1 disposed on and releasably secured to the stuffing horn taken along line II—II of FIG. 1.

FIG. 1a is a sectional side elevation corresponding to FIG. 1 with the tubular casing subjected to strong braking.

FIG. 2a is a transverse sectional view of the annular hollow body taken along the line II—II of FIG. 1a.

FIG. 3 is an end view of a modified embodiment of the annular hollow body having resilient crosspieces for securing the hollow body to a stuffing horn.

FIG. 4 is a sectional view of the hollow body of FIG. 3 taken along the line IV—IV.

FIG. 5 is a sectional view of the hollow body of FIG. 3 taken along the line V—V.

FIG. 8 is a transverse sectional view of a modified form of the hollow body of FIG. 3 disposed on and secured to a stuffing horn taken along the line VIII—VIII of FIG. 10.

FIG. 9 is a transverse sectional view of the hollow body of FIG. 3 or FIG. 8 during removal from the stuffing horn.

FIG. 10 is a sectional elevation of the apparatus of FIG. 8 taken along the line X—X.

FIG. 11 is a schematic representation of an apparatus for filling a shirred, tubular casing during the filling operation.

DETAILED DESCRIPTION OF PREFERRED EMBODIMENTS

Figure 6:
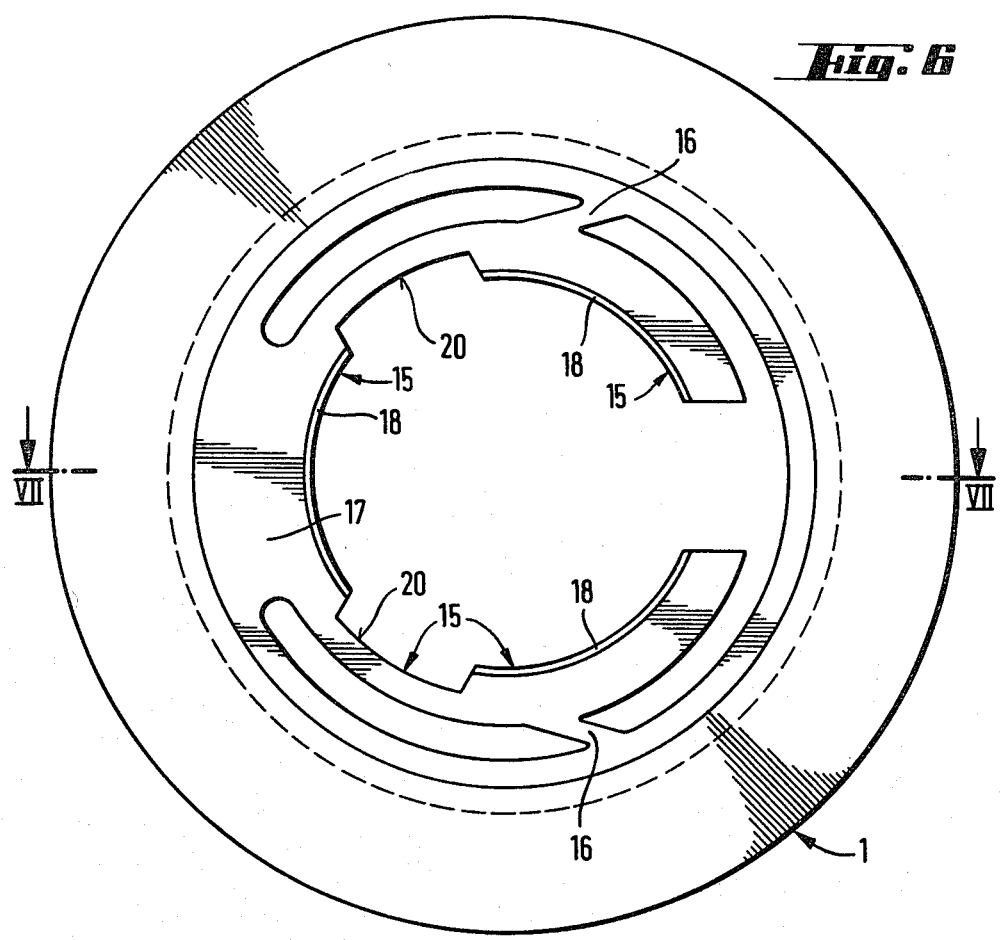
FIG. 6 is an end view of a further embodiment of the annular hollow body having a securing ring.

The basic principles of construction of devices and apparatus of this general type are known. However, in contrast to the known devices, the maximum diameter of the annular or cylindrical hollow body according to the invention is smaller than the inner diameter of the unshirred tubular casing. The effectiveness of such a device was totally unexpected since the prevailing opinion prior to the present invention was that stretching and expanding of the tubular casing was always required for simultaneous deshirring and smoothing of the tubular casing. For simplicity of discussion, the following text will use only the term "annular hollow body".

An annular hollow body having a maximum diameter which is smaller than the inner diameter of a deshirred tubular casing is described in U.S. Pat. No. 3,975,795. However, this known hollow body serves only to smooth the tubular casing while a ring having a central opening or bore through which the tubular casing is drawn is provided in front of the annular hollow body for deshirring the casing.

It has now been found, surprisingly, that an expansion for simultaneous deshirring and smoothing of the tubular casing is not necessary for satisfactory filling of the tubular casing, but instead is a disadvantage. It is completely sufficient if the tubular casing is drawn over the outer surface of the annular hollow body in order to simultaneously deshirr and smooth it without any expansion of the tubular casing beyond its original diameter. Preferably, the maximum diameter of the annular hollow body will be from 70 to 99 percent, most preferably from 90 to 99 percent, of the internal diameter of the unshirred tubular casing. Further, the braking of the tubular casing during the stuffing operation does not take place after the deshirring and smoothing. The braking also is not effected by spreading or stretching the tubular casing. Instead, the braking is carried out in a single device together with the deshirring and smoothing.

The tubular casing is made, for example, from a material customarily used for producing sausages, such as cellulose hydrate, collagen or synthetic intestines, for example of a polyamide or polyester. Optionally, the tubular casing may be fiber reinforced, particularly with a paper insert. The casing may have the usual coatings on its outer and/or inner surfaces, e.g. of a material impermeable to water vapor and oxygen, which may be anchored to the surface of the tubular casing by conventional adhesion-promoting means. When a cellulose hydrate casing is used, it may have the usual water content of from 6 to 15 percent, but it also may have a very high water content of up to approximately 35 percent, so that the casing does not need to be soaked in water prior to stuffing. Cellulose hydrate casings are generally produced by coagulation of viscose and regeneration of the cellulose.

The two essential elements of the apparatus of the invention are the annular hollow body which is disposed inside the tubular casing and mounted on the outer surface of the stuffing horn, and which simultaneously deshirrs and smooths the tubular casing before it is filled with sausage mixture, and the adjustable brakes which cooperatively engage the recess or groove provided in the outer surface of the annular hollow body. The annular hollow body comprises an annular disk or a cylinder having a circular outer surface and having a central opening so that it may be disposed on and releasably secured to the stuffing horn of a conventional stuffing machine adjacent the stuffing horn outlet. The central opening thus has a diameter which substantially corresponds to the outer diameter of the stuffing horn and is preferably substantially cylindrical. The mouth of the central opening in the annular hollow body adjacent the stuffing horn outlet is preferably conically shaped or extended so that it forms a funnel-like opening for the stuffing horn outlet. The stuffing machine serves to fill tubular casings with a material such as a sausage mixture. The releasable attachment of the annular hollow body on the stuffing horn may be effected, for example, by means of threads, by means of a bayonet lock, by means of a snap lock utilizing break-off elements as described in U.S. Pat. No. 4,034,441, by means of resilient crosspieces, or by means of a securing ring according to German Industrial Standard (DIN) 471/472 arranged adjacent to or in the central opening of the annular hollow body, which engages a groove, recess or rib on the stuffing horn. The annular hollow body is advantageously relatively rigid and inelastic and generally is made of a metal or a synthetic material such as polypropylene or polyethylene. When a synthetic material having a modulus of elasticity from $10^3$–$10^4$ N/mm$^2$ is used, a thickness of from 2 to 6 mm is adequate to obtain a sufficiently rigid hollow body. The resilient crosspieces provided for securing the hollow body in position must then have a relatively small thickness of approximately 2 to 3 mm so that they are elastically resilient. To reduce the friction between the outer peripheral surface of the annular hollow body and the tubular casing, the outer surfaces may advantageously be provided with an appropriate coating, e.g. a coating of perfluorinated hydrocarbon material.

The exterior surface of the outer periphery of the annular hollow body has a circumferential, annular recess which has a substantially U-formed or V-formed cross-sectional configuration and which preferably extends all the way around the outer surface of the annular hollow body. Adjacent this recess in the direction of the two end faces, the annular hollow body has its maximum diameter. An unshirred portion of the tubular casing is drawn over these outer surfaces.

The maximum diameter of the annular hollow body ensures that the tubular casing attains an internal diameter during the simultaneous deshirring and smoothing, which is smaller than the internal diameter which the tubular casing had prior to shirring. Preferably the annular hollow body will cause the tubular casing to attain an internal diameter which is from 70 to 99 percent, preferably from 90 to 99 percent, of the inner diameter of the tubular casing prior to shirring. Thus, stretching or expansion of the casing and the resulting detrimental effect on the filling process are avoided.

In one embodiment of the annular hollow body of the invention, the maximum circumference adjacent the recess in each case is variable so that the hollow body can be utilized for tubular casings of various calibers. The variation of its circumference may be effected, for example, with a second annular calibrating piece which is likewise disposed on the stuffing horn and which, by pressing its outer surface against the inner surface of the central opening of the annular hollow body causes the opening to expand, thereby causing the maximum outer circumference of the annular hollow body also to increase. In order for the annular hollow body to be sufficiently flexible to expand, it must have a relatively small thickness. In this embodiment, the central opening at one of the two end faces of the annular hollow body must be conically extended and/or at one of the end faces of the annular hollow body must terminate in the form of a conically extending flange. By means of the contact pressure between the exterior surface of the second annular calibrating piece against the central opening of the annular hollow body in the region of the conical extension, the maximum circumference of the annular hollow body is increased. This controllable expansion of the hollow body may be effected in a manner analagous to the expansion of calibrating devices illustrated in FIGS. 1, 2 or 4 of U.S. Pat. No. 4,202,075 or in FIG. 27 of U.S. Pat. No. 3,264,679. One of the two parts of the device, namely the annular hollow body or the second annular calibrating piece, is releasably secured to the stuffing horn while the other apparatus part is variably positioned on the stuffing horn, for example by means of threads. It is also possible to provide expansible openings at both end faces of the annular hollow body so that a further calibrating part can be utilized.

The deshirred portion of the tubular casing around the annular hollow body is pressed by a brake into the recess in the outer circumference of the annular hollow body whereby the diameter of the casing is reduced and a compressing and braking force is exerted. The brake may comprise one segment or a plurality of individual segments which together form a ring, whereby separations may optionally be left between the individual segments. The form of the recess on the outer circumference of the annular hollow body preferably matches the form of the brake. It is advantageous if the brake acts on the largest possible portion of the circumferential surface of the deshirred tubular casing. The brake may be circular, but it may also have the form of a polygon comprised of V-shaped, W-shaped or Y-shaped segments. The corners of the polygon may also be rounded off so that the brake segments have a sinusoidal cross section. The surfaces of the brake preferably comprise a resilient material, e.g. rubber, and/or have a smooth surface so that the tubular casing will not be damaged when the brake is pressed against it.

The pressing of the tubular casing into the recess of the annular hollow body maximally takes place to a depth which is equal to the depth of the recess in the annular hollow body.

The width of the recess in the outer surface of the annular hollow body is generally greater than 50 percent of the length of the body. Advantageously, the recess may begin adjacent the two end faces of the annular hollow body. For example, in the case of tubular casings having a diameter of 90 to 120 mm, the length of the annular hollow body is 20 to 100 mm, and the maximum diameter of the annular hollow body in the vicinity of the two end faces amounts, depending on the diameter of the tubular casing, to about 89 to 119 mm. The minimum outer diameter of the annular hollow body is about 5 to 10 mm greater than the outer diameter of the stuffing horn, which is generally between 25 and 60 mm in size. The minimum diameter of the hollow body is thus from 25 to 65, preferably from 35 to 55, percent smaller than its maximum diameter.

After the annular hollow body and the stuffing horn outlet which follows thereafter, there is a device for closing or tying off the tubular casing, e.g. a clip device, and a cutting station.

In the stuffing process, the deshirred end of the stick or hollow rod which is drawn over the annular hollow body is pushed by the filling mixture stuffed therein through the clip device. During the filling operation, the tube which is continuously withdrawn from the shirred casing slides over the annular hollow body. Due to the pressure with which the paste-like filling material, for example a sausage mixture, is pressed through the stuffing horn into the deshirred portion of the tubular casing, the casing continues to slide over the outer surface of the annular hollow body whereby it is simultaneously deshirred and smoothed and a retarding of movement or braking of the tubular casing takes place as a result of the frictional forces from the opposing contact between the brake, tubular casing and hollow body. The braking effect is regulated by the degree to which the casing is contracted by the brake. Generally, withdrawal speeds of from 10 to 20 meters per minute are used. The length of the external surface of the annular hollow body is advantageously from 2 to 4 cm so that at this withdrawal speed the maximum contact time between the outer surface of the annular hollow body and the inner surface of the tubular casing is generally approximately 0.2 to 0.3 seconds. The shirred portion of the tubular casing is held back by the annular hollow body. Thus, it is assured that only deshirred and smoothed tubing can enter the brake unit. The device facilitates an exact and jerk-free braking action, so that the danger of tearing the casing is clearly reduced. When a predetermined length of the tubular casing has been stuffed with sausage material, it is closed, for example with the clipping device, and the resulting sausage is separated from the remaining portion of the tubular casing. When the tubular casing is completely filled, the annular hollow body may be removed from the stuffing horn and can, if desired, be reused.

The prepackaged article of manufacture of the invention comprises a shirred tubular casing which is provided around its outside with a protective covering, and an annular hollow body which is arranged at one end of the tubular casing and which is surrounded by an unshirred portion of the casing. The protective cover comprises, in particular, a heat-sealable, thermoplastic synthetic material, such as a polyamide, polyvinylchloride or polyolefin, which optionally may have a latent ability to shrink activatable by heat. The protective cover forms a supporting container for the shirred tubular casing which is disposed in its hollow interior.

In a preferred embodiment annular disks are provided at the ends of the shirred tubular casing with the protective covering extending through a central opening of the disk and being turned back 180° around the outer circumference of the disk toward the center of the protective covering as illustrated in FIG. 4 of German Offenlegungsschrift 25 10 637. The turned back portion of the protective covering may advantageously be heat sealed to the outer surface of the protective cover in contact with the tubular casing.

The protective cover may be a tubular film, particularly a film with perforations or a net-like or lattice-like structure. With a protective cover made of a shrinkable film, the shrinking is advantageously activated only at the ends of the tubular casing, e.g. only in the region of the portion which is turned back around the annular disk.

The deshirred portion of the tubular casing, which extends around the outer surface of the annular hollow body, is disposed outside of the protective cover, whereby the annular disk and one end of the hollow body are immediately adjacent each other.

In order to stuff or fill the article of manufacture according to the invention, the open end of the shirred tubular casing is pushed onto the stuffing horn of a stuffing machine, and the annular hollow body with the connecting elements, e.g. the resilient crosspieces or the securing ring according to German Industrial Standard (DIN) 471/472, on its inner circumference is secured to the outer surface of the stuffing horn adjacent the stuffing horn outlet. A paste-like mass, for example a sausage mixture, is then forced out of the stuffing horn into the tubular casing whereby the tubular casing slides through the central aperture of the annular disk and thereafter over the outer surface of the annular hollow body during which it is deshirred and smoothed. The brake parts press against the outer surface of the deshirred tubular casing whereby the tubular casing is pressed into the annular recess on the outer circumference of the annular hollow body. The diameter of the central aperture of the annular disk of the article of manufacture must be sufficiently large. It is advantageously at least as large as the internal diameter of the shirred tubular casing.

Turning now to the drawings, FIG. 1 or FIG. 1a shows an annular hollow body 1 releasably secured on the stuffing horn 2 of a stuffing machine (not shown) by means of a bayonet lock. A shirred tubular casing 4 is disposed on the stuffing horn 2, whereby a deshirred portion 5 is extended around the hollow body 1 and is pressed slightly (FIG. 1) or strongly (FIG. 1a) into the recess 6, which has a V-shaped or U-shaped cross section, by the brakes 7a and 7b. The central opening 9 of the hollow body 1 is conically expanded like a funnel adjacent the stuffing horn outlet 8. Reference numeral 10 designates the brake lining, and reference numeral 11 the stuffed sausage material.

In FIGS. 2 and 2a, the reference numerals have the same meaning as in FIGS. 1 and 1a. These figures show the Y-shaped or V-shaped cross section of segments 7a and 7b of the brakes which are slightly (FIG. 2) or strongly (FIG. 2a) pressing the deshirred tubular casing 5 annularly inwardly in the region of recess 6 of the hollow body 1.

FIGS. 3-5 illustrate one type of securing means for the annular hollow body. The outer surface 12 forms a closed surface. The inner circumference is provided with three elastically resilient crosspiece-like elements 13, the marginal edges 14 of which in both directions parallel to the longitudinal axis have a curved configuration.

Figure 7:
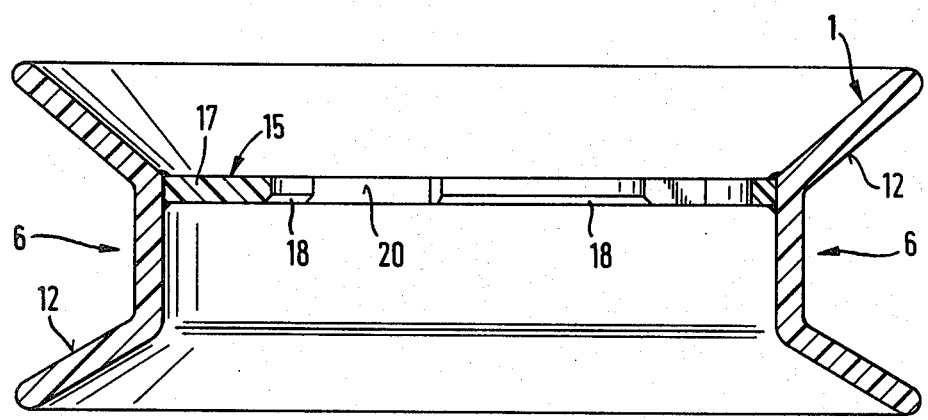
FIG. 7 is a sectional view of the hollow body of FIG. 6 taken along the line VII—VII.

In FIGS. 6 and 7, the annular hollow body 1 has the same form as in FIG. 3, except in place of the crosspiece-like elements, a securing ring according to German Industrial Standard (DIN) 471/472 is provided which is joined to the inner circumference of the hollow body 1 by means of two webs 16 and at the base 17 of the securing ring. The ring is inserted with its bevelled inner edges 18 in the groove 19 of the stuffing horn 2 (FIG. 8), whereby the recesses 20 in securing ring 15 are required so that the ring may be slid over the ribs or cams 21 on the stuffing horn 2.

In FIGS. 8 and 10, the annular hollow body 1 is disposed on a stuffing horn 2 with the crosspiece-like elements 13 received in a furrow or groove 19 on the stuffing horn 2. To remove the annular hollow body 1 from the stuffing horn 2, it is rotated in the direction of the arrow 22 until it comes to the position shown in FIG. 9, whereby the elastically resilient crosspiece-like elements 13 are forced up on top of the ribs or cams 21 so that the annular hollow body 1 can be pulled off the stuffing horn 2. A shirred tubular casing 4 is disposed on the stuffing horn 2 and slides over the outer surface 12 of the annular hollow body 1 whereby it is deshirred and smoothed.

FIG. 10 also clearly shows how the brake elements 7a and 7b press the deshirred tubular casing 5 into the annular recess 6 in the outer circumference of hollow body 1 in order to brake or restrain the motion of the casing.

FIG. 11 is a sectional side view of an apparatus in which a paste-like sausage material 11 from a stuffing horn 2 is stuffed under pressure into a tubular casing 5. The casing 4 in the shirred state is disposed on the stuffing horn 2 and slides over the annular hollow body 1. The casing is restrained by the braking elements 7a and 7b and passes through the schematically illustrated conventional cutting station 23 and tying station 24.

Figure 12:
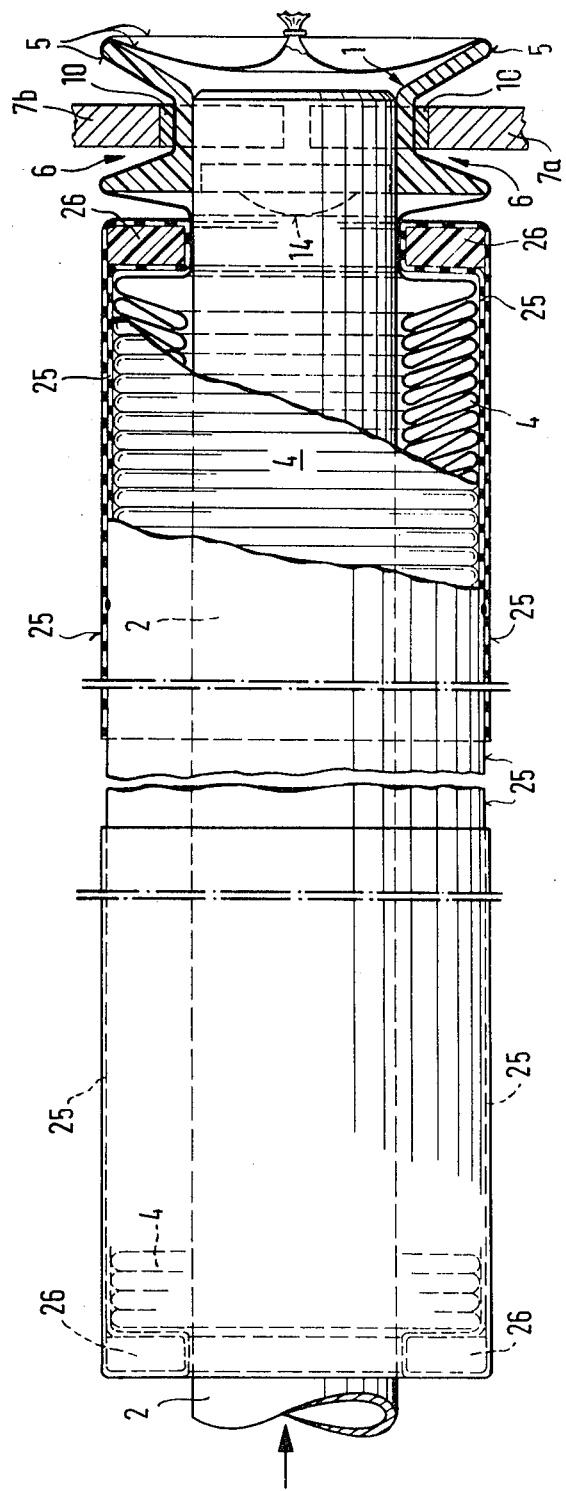
FIG. 12 is a partially cut away side view of an article of manufacture comprising a device for deshirring and smoothing a tubular casing packaged with a shirred tubular casing in a protective cover.

FIG. 12 illustrates a prepackaged article of manufacture comprising a shirred tubular casing 4 having an unshirred portion 5 which is drawn over the hollow body 1 and is closed off. A protective covering 25 surrounds the shirred tubular casing 4 and is turned back around an annular disk 26. The protective cover is turned back to the midsection of the shirred tubular casing, and the turned back portion is joined by heat sealing to the portion of the protective cover which surrounds the shirred tubular casing. In order to be stuffed with a paste-like material, the open end of the article of manufacture is slid onto the stuffing horn 2 and the hollow body 1 is secured to the outer surface of the stuffing horn 2 adjacent the stuffing horn outlet.

The foregoing description has been set forth merely to illustrate the invention and is not intended to be limiting. Since modifications of the described embodiments incorporating the spirit and substance of the invention may occur to persons skilled in the art, the scope of the invention is to be limited solely with respect to the appended claims and equivalents.

What is claimed is:

1. A device for deshirring, smoothing and braking a shirred tubular casing during the stuffing of the tubular casing with a fluid material, said device comprising a hollow body having an outer circumferential surface with a substantially circular cross section and having a central opening with fastening means so that the hollow body may be received on and releasably secured to the exterior surface of the stuffing horn of a stuffing device adjacent the stuffing horn outlet, said hollow body being disposable in the interior of a deshirred portion of a shirred tubular casing having a prescribed internal diameter, said hollow body being substantially rigid and having a substantially annular, cylindrical form with an outer periphery, presenting a plurality of smooth surfaces, the maximum outer diameter of the hollow body being smaller than the prescribed inner diameter in the unshirred condition of the tubular casing to be filled, and the outer circumferential surface of the hollow body being provided with an annular recess having a substantially V-shaped or U-shaped cross section, the minimum diameter of the hollow body in the region of the recess being from 25 to 65 percent smaller than the maximum diameter of the hollow body.

2. A device according to claim 1, comprising a braking device for limiting the speed of withdrawal of the tubular casing wherein the braking device substantially annularly surrounds the hollow body in the region of said recess, and the braking device can be pressed into the recess with an adjustable pressure.

3. A device according to claim 1, wherein the maximum diameter of the hollow body is from 70 to 99 percent of the inner diameter of the tubular casing prior to shirring.

4. A device according to claim 3, wherein the maximum diameter of the hollow body is from 90 to 99 percent of the inner diameter of the tubular casing prior to shirring.

5. A device according to claim 2, wherein said braking device comprises a plurality of individual curved elements which together form a ring which substantially surrounds the outer circumference of the hollow body.

6. A device according to claim 5, wherein the ring formed by the braking elements has the form of a polygon.

7. A device according to claim 2, wherein said braking device comprises at least two brake elements having a shape selected from the group consisting of V-shaped, W-shaped and Y-shaped, and said brake elements can be pressed with both of their arms against the outer surface of the deshirred tubular casing.

8. A device according to claim 1, wherein the central opening of said hollow body has a funnel-like form at one end.

9. A device according to claim 1, wherein the central opening of the hollow body is provided with at least two elastically resilient crosspieces each having the form of a straight secant with reference to the substantially circular cross section of said central opening, said crosspieces being symmetrically arranged with respect to the center of said hollow body and located in a common plane perpendicular to the longitudinal axis of said hollow body, the form of the crosspieces corresponding to the form of mating ridges, grooves or furrows on the outer surface of a stuffing horn with which they may form a releasable lock.

10. A device according to claim 1, wherein the central opening of the hollow body is provided with an expandable securing ring for releasably securing said hollow body to a stuffing horn.

11. An apparatus for stuffing a shirred tubular casing with a fluid material which flows under pressure out of the stuffing horn of a stuffing device, said apparatus comprising
a stuffing horn,
a shirred tubular casing disposed on the outer surface of said stuffing horn, said casing having an unshirred portion having a prescribed inner diameter,
a hollow body for deshirring and smoothing said tubular casing disposed within the unshirred portion of said tubular casing and secured to the outer surface of said stuffing horn, the outer circumferential surface of said hollow body having a substantially circular cross section, said hollow body having a central opening for receiving the stuffing horn, means in said opening for releasably securing said hollow body to said stuffing horn, said hollow body comprising a rigid material and having a substantially annular, cylindrical form with an outer periphery having a plurality of surfaces, the maximum exterior diameter of said hollow body being smaller than said prescribed inner diameter of the unshirred tubular casing, the outer circumferential surface of said hollow body being provided with an annular recess having a substantially V-shaped or U-shaped cross section, the minimum diameter of said hollow body in the region of said recess being from 25 to 65 percent smaller than the maximum diameter of said hollow body,
a braking unit for restraining the movement of the tubular casing having an opening through which the deshirred portion of the tubular casing extends, said braking unit surrounding the deshirred portion of said tubular casing in the region of said recess in the hollow body and urging said tubular casing with an adjustable pressure into said recess,
a tying device disposed following said stuffing horn for applying a closure to said tubular casing after a predetermined length of the tubular casing has been stuffed with fluid material, and
cutting station for separating the stuffed and closed portion of the tubular casing,
whereby the inner wall of said tubular casing slides over the outer circumferential surface of said hollow body and is thereby deshirred and smoothed and the motion of the tubular casing is restrained by the extension of the braking unit into the region of the recess in the hollow body.

12. An apparatus according to claim 11, wherein the maximum diameter of said hollow body is from 70 to 99 percent of the inner diameter of said tubular casing prior to shirring.

13. An apparatus according to claim 11, wherein said braking device comprises a plurality of individual curved elements which together form a ring which substantially surrounds the outer circumference of said hollow body.

14. An apparatus according to claim 11, wherein said ring formed by said brake elements has the form of a polygon.

15. An apparatus according to claim 11, wherein said braking device comprises at least two brake elements having a shape selected from the group consisting of V-shaped, W-shaped and Y-shaped, and said brake elements can be pressed with both of their arms against the outer surface of the deshirred tubular casing.

16. An apparatus according to claim 11, wherein the central opening of said hollow body has a funnel-like form at its end adjacent the stuffing horn outlet.

17. An apparatus according to claim 11, wherein said central opening of said hollow body is provided with at least two elastically resilient crosspieces each having the form of a straight secant with reference to the substantially circular cross section of said central opening, said crosspieces being arranged symmetrically with respect to the center of said hollow body and located in a common plane perpendicular to the longitudinal axis of said hollow body, the form of said crosspieces corresponding to the shape of mating ridges, grooves or furrows on the outer surface of said stuffing horn with which they form a releasable lock.

18. An apparatus according to claim 11, wherein said central opening is provided with an expandable securing ring for releasably securing said hollow body to said stuffing horn.

19. A prepackaged article of manufacture for use with a stuffing device comprising a shirred tubular casing for containing a food substance, said casing having an unshirred end which is closed off, a device for deshirring and smoothing said casing during the stuffing process disposed within the unshirred end of said casing, said deshirring and smoothing device having the form of an annular, cylindrical hollow body of a rigid material with a peripheral surface presenting a plurality of smooth surfaces having a substantially circular cross section and with a central opening having fastening elements for receiving and releasably securing said hollow body on the outer surface of a stuffing horn of a stuffing device, the maximum external diameter of said hollow body being smaller than the predetermined internal diameter in the unshirred condition of the tubular casing, the outer circumferential surface of said hollow body having an annular recess with a substantially V-shaped or U-shaped cross section, and the minimum diameter of said hollow body in the region of said recess being from 25 to 65 percent smaller than the maximum diameter of said hollow body; and a protective cover surrounding the exterior of the tubular casing; whereby said article of manufacture can be received on and secured to the stuffing horn of a stuffing device and as the deshirred portion of the tubular casing is stuffed with a fluid material from the stuffing horn, the shirred portion of said tubular casing is drawn over said hollow body and thereby deshirred and smoothed prior to filling.

20. An article of manufacture according to claim 19, wherein said central opening of said hollow body is provided with at least two elastically resilient crosspieces each having the form of a straight secant with reference to the substantially circular cross section of said central opening, disposed in a symmetrical arrangement with respect to the center of said hollow body and in a common plane perpendicular to the longitudinal axis of said hollow body, the form of said crosspieces corresponding to the form of mating ridges, grooves or furrows on the outer surface of a stuffing horn with which they may form a releasable lock.

21. An article of manufacture according to claim 19, wherein said central opening of said hollow body is provided with an expandable securing ring for securing said hollow body to a stuffing horn by engaging ridges, grooves or furrows on said stuffing horn.

22. An article of manufacture according to claim 19, wherein said protective cover surrounds only the shirred portion of said tubular casing and leaves uncovered the unshirred portion of the tubular casing which surrounds said hollow body.

23. An article of manufacture according to claim 22, wherein the protective cover extends through the central aperture of an annular disk provided at both ends of the shirred portion of said tubular casing and is turned back over the outer surface of said annular disk toward the midsection of said tubular casing.

24. An article of manufacture according to claim 23, wherein the turned back portion of said protective cover is joined by heat-sealing to the portion of the protective cover which surrounds said tubular casing.

25. An article of manufacture according to claim 19, wherein said protective cover comprises a heat-shrinkable film of synthetic material which is shrunk at the ends of the tubular casing.

* * * * *